(12) United States Patent
Li

(10) Patent No.: US 10,871,254 B2
(45) Date of Patent: Dec. 22, 2020

(54) WATER-SOLUBLE PIPE-PLUGGING DEVICE AND PIPE PLUGGING METHOD THEREOF

(71) Applicant: Deen Li, Shandong (CN)

(72) Inventor: Deen Li, Shandong (CN)

( * ) Notice: Subject to any disclaimer, the term of this patent is extended or adjusted under 35 U.S.C. 154(b) by 71 days.

(21) Appl. No.: 16/302,537

(22) PCT Filed: May 16, 2017

(86) PCT No.: PCT/CN2017/084500
§ 371 (c)(1),
(2) Date: Nov. 16, 2018

(87) PCT Pub. No.: WO2017/215387
PCT Pub. Date: Dec. 21, 2017

(65) Prior Publication Data
US 2019/0203869 A1    Jul. 4, 2019

(30) Foreign Application Priority Data

Jun. 12, 2016 (CN) .......................... 2016 1 0409692
Jun. 12, 2016 (CN) ..................... 2016 2 0561298 U

(51) Int. Cl.
*F16L 55/10* (2006.01)
*F16L 55/11* (2006.01)

(52) U.S. Cl.
CPC ........... *F16L 55/1011* (2013.01); *F16L 55/11* (2013.01); *F16L 55/1116* (2013.01)

(58) Field of Classification Search
CPC ...... B23K 9/326; E02B 17/0013; F16L 55/10; F16L 55/1011; F16L 55/11;
(Continued)

(56) References Cited

U.S. PATENT DOCUMENTS 932,766 A * 8/1909 Daniels ................. E21B 33/134
166/135
3,291,156 A * 12/1966 Corsano ................ F16L 55/132
138/89

(Continued)

FOREIGN PATENT DOCUMENTS

CN    204387571      6/2015
CN    204387571 U   6/2015
(Continued)

OTHER PUBLICATIONS

Wang, Rui; International Search Report; 9 pages; PCT/CN2017/084500; dated Aug. 22, 2017.

(Continued)

*Primary Examiner* — Robert K Arundale
*Assistant Examiner* — Richard K. Durden
(74) *Attorney, Agent, or Firm* — Todd Allen Serbin; Nexsen Pruet, LLC

(57) ABSTRACT

Disclosed is a water-soluble pipe-plugging device, comprising a circular plugging plate made of a water-soluble material. Several support plates made of a water-soluble material are provided on a side surface of the circular plugging plate. The outer side faces of the support plates are flush with the outer side face of the circular plugging plate. The pipe-plugging device has a simple structure, is convenient to use, has high strength, uniform load under stress, good pressure-bearing capacity and good plugging effects, can ensure the safety of construction with welding during repair and replacement, can thoroughly decompose without needing to be removed so as to avoid pollution and pipe plugging, and is biodegradable so as to avoid environmental pollution.

9 Claims, 1 Drawing Sheet

(58) Field of Classification Search
CPC .. F16L 55/1116; F16L 55/128; F16L 55/1283; F16L 55/136; F16L 55/1612; F16L 55/40; F16L 55/42
USPC .......................... 102/333; 138/89, 90, 91, 98
See application file for complete search history.

(56) References Cited

U.S. PATENT DOCUMENTS

| | | | | |
|---|---|---|---|---|
| 3,338,499 | A † | 8/1967 | Gilbert | |
| 4,968,197 | A * | 11/1990 | Chen | F16L 55/132 138/90 |
| 5,318,075 | A † | 6/1994 | Roll | |
| 6,619,326 | B1 | 9/2003 | Pryne | |
| 6,843,108 | B1 * | 1/2005 | Hunt | G01M 3/022 138/89 |
| 7,112,358 | B1 † | 9/2006 | Hacikyan | |
| 8,616,432 | B1 † | 12/2013 | Hacikyan | |
| 8,647,731 | B2 † | 2/2014 | Hacikyan | |
| 2008/0236691 | A1 * | 10/2008 | Roll | F16L 55/1141 138/92 |
| 2014/0209200 | A1 * | 7/2014 | Nakaya | F16L 37/144 138/89 |

FOREIGN PATENT DOCUMENTS

| | | |
|---|---|---|
| CN | 105458471 A | 4/2016 |
| CN | 205155448 | 4/2016 |
| CN | 205155448 U | 4/2016 |
| CN | 105889692 A | 8/2016 |
| CN | 205678348 U | 11/2016 |
| JP | 109196280 A | 7/1997 |
| JP | H09196280 | 7/1997 |

OTHER PUBLICATIONS

AB Paper Company, Shur-Purge, Jan. 1, 1997, AB Paper Company, Centralia, WA.†

Canadian Intellectual Property Office (CIPO), Canadian Patent Application No. CA3024203 of Deen Li—Requisition by Examiner, Sep. 30, 2019.†

Deen Advanced Energy Equipments Inc., Products, Jul. 8, 2019 or earlier.†

* cited by examiner
† cited by third party

WATER-SOLUBLE PIPE-PLUGGING DEVICE AND PIPE PLUGGING METHOD THEREOF

RELATED APPLICATIONS

The present application is a U.S. national phase application, claiming priority under 35 U.S.C. 371 to PCT application PCT/CN2017/084500, filed on May 16, 2017, claiming priority to Chinese Patent Applications Nos. 201610409692.4 and 201620561298.8 filed with the Chinese Patent Office on Jun. 12, 2016 and entitled "WATER-SOLUBLE PIPE-PLUGGING DEVICE AND PIPE-PLUGGING METHOD THEREOF," which are incorporated herein by reference in their entireties.

FIELD OF THE INVENTION

The present invention relates to a water-soluble pipe-plugging device and a pipe-plugging method thereof.

DESCRIPTION OF RELATED ART

At present, pipes for transporting flammable and explosive materials, such as natural gas and petroleum, need to be replaced or repaired as a period of use due to pipe corrosion, while welding operation is required for replacement and repair. During a welding operation, severe explosion or burning accidents could take place if the flammable and explosive materials could not be effectively isolated. In the past, the methods to plug a pipe mainly included: (1) plugging with lubricating grease, which is also referred to as a lubricating grease wall; according to this method, a certain amount of lubricating grease is pushed into a pipe section to be repaired from both ends to form a lubricating grease plug, so as to achieve plugging and isolation. The drawback is that an operator needs to complete the welding operation within a short period of time, otherwise the lubricating grease would collapse and be no longer useful. It is impossible to take out the lubricating grease, which stays inside the pipe and becomes a pollution to the pipeline. The lubricating grease is unable to withstand pressure. If the lubricating grease is broken due to pressure, an accident would take place. Since the lubricating grease wall is unable to withstand pressure, it is necessary to use a large quantity of water and nitrogen to replace the hazardous gas inside the pipe before the construction. (2) Plugging with a rubber ball, which is also referred to as a pipe cleaning ball: according to this method, an inflatable rubber isolating ball is placed at each of the two ends of a pipe section to be repaired, which work with a lubricating grease wall to achieve plugging and isolation. When the operation is completed, the isolating balls need to be retrieved. The drawback is that the rubber isolating balls have to be retrieved, while it is necessary to destroy the rubber isolating balls during the retrieving process. The damaged rubber residue can pollute the pipeline and also block instruments on the pipeline. Since this method is similarly unable to withstand pressure, it is necessary to use a large quantity of water and nitrogen to replace the hazardous gas inside the pipe before the construction. (3) Freezing plugging method: according to this method, a pipe section to be replaced is filled with water, a freezing apparatus is used to freeze two segments of ice columns inside the pipe section to achieve plugging and isolation. The drawback is that a tremendous amount of preparation is needed before the operation and a plenty of resources are consumed. In a season of high temperature, it takes a very long time to freeze, while in a cold region, it takes a long time to fully melt the ice columns after the operation is completed, which causes a waste of resources.

SUMMARY OF THE INVENTION

To overcome the drawbacks of the prior art, the present invention provides a water-soluble pipe-plugging device and a pipe-plugging method thereof. It has a simple structure, is easy to use, has high strength, has a uniform load under stress, can withstand high pressure, achieves excellent plugging effect, ensures the safety of welding operation during repair and replacement, and can be thoroughly decomposed. Therefore, there is no need to take it out, pipes will not be polluted and plugged, and the environment will not be polluted due to its biodegradability. The problems that the prior art have are solved.

To solve the above technical problems, the present invention employs the following technical solution:

a water-soluble pipe-plugging device, comprising a circular plugging plate made of a water-soluble material, several support plates made of a water-soluble material being provided on the surface of one side of the circular plugging plate, and the outer side faces of the support plates being flush with the outer side face of the circular plugging plate.

The support plates are arranged perpendicularly to the circular plugging plate.

The support plates are circumferentially arranged on the surface of one side of the circular plugging plate at an even interval.

The support plates are bonded by a water-soluble glue to the circular plugging plate.

A notch is formed on the bottom of the support plates at a position close to the edge of the circular plugging plate.

The several support plates are integrally connected via a reinforcing ring made of a water-soluble material.

A water-soluble pipe-plugging method comprises the following specific steps:

(a) Cutting off, through cold cutting, a part of an old pipe to be replaced or repaired;

(b) Using a clean wiping rag to clean the inner wall of the old pipe at both sides of the cut in the step (1) until there is no grease or dirt;

(c) Determining a position for installing the product where the product temperature is below 60° C. according to heat conduction generated from the welding location during welding, and drawing a line on the inner wall of the old pipe at both sides;

(d) Spreading a ring of a water-soluble glue at the position of the line on the inner wall of the old pipe at both sides, respectively;

(e) Selecting a circular plugging plate of a diameter corresponding to the inner diameter of the old pipe, and the diameter of the circular plugging plate is slightly greater than the inner diameter of the old pipe;

(f) Pushing one circular plugging plate into the old pipe at both sides, respectively, such that the edge of the circular plugging plate rests tightly against the water-soluble glue in the step (4);

(g) Securing several support plates with the water-soluble glue onto the surface of the external side of the two circular plugging plates, respectively;

(h) Bonding each support plate to the inner wall of the old pipe at both sides, respectively;

(i) Pushing a new pipe into the cut in the step (a);

(j) Welding the new pipe to the old pipe.

In the step (f), an operator uses a pushing device to push the circular plugging plates into the old pipe.

The pushing device comprises a disc and a push rod is fixed perpendicularly to the center of the disc.

By employing the above solution, the present invention has the following advantages:

(1) A standard for safe construction operations is developed for replacement and repair of hazardous pipes that transport natural gas, hazardous chemicals, petroleum, and the like;

(2) The water-soluble pipe-plugging device and required auxiliary materials are all made of a water-soluble material, which can be thoroughly decomposed. Therefore, there is no need to take it out, pipes will not be polluted and plugged, and the environment will not be polluted due to its biodegradability;

(3) The operation and use thereof are simple and do not require additional power. An operator can rapidly complete the installation in a manual manner, which greatly reduces the preparation work at the beginning and saves resources;

(4) The product has high strength, has a uniform load under stress, can withstand high pressure, effectively stops accidents from happening, and improves the safety of hazardous pipes during construction;

(5) The product is packaged as a complete repair kit with all involved auxiliary materials, from pipe cleaning to installation, included in one package, making it more convenient to use.

Wherein, 1. circular plugging plate, 2. support plate, 3. notch, and 4. reinforcing ring.

DETAILED DESCRIPTION OF THE INVENTION

To clearly describe technical features of the present solution, the present invention will be described in detail below through specific implementation manners and with reference to the accompanying drawings.

Figure 1:
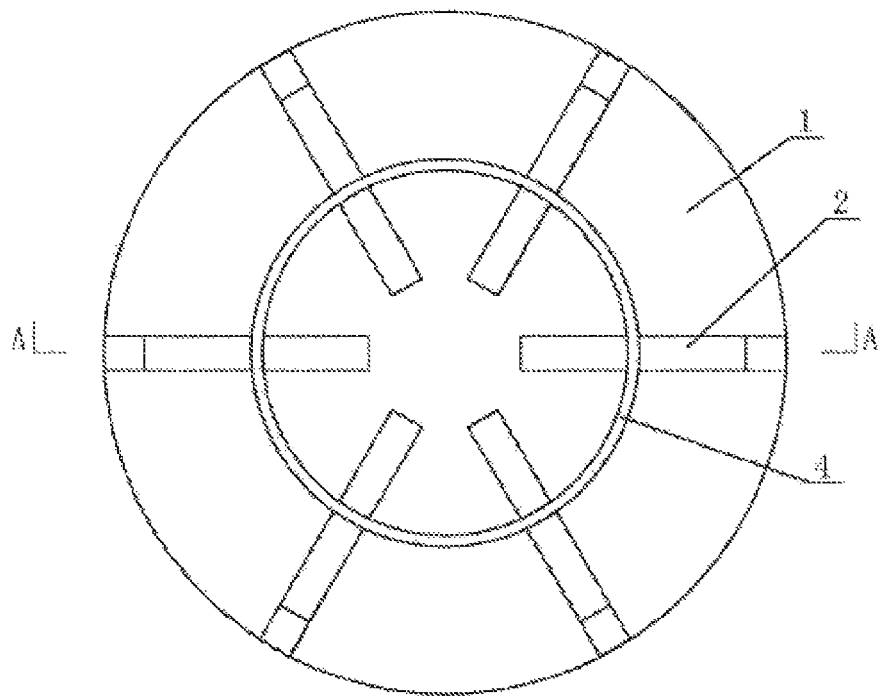
FIG. 1 is a schematic structural diagram of the present invention.
Figure 2:
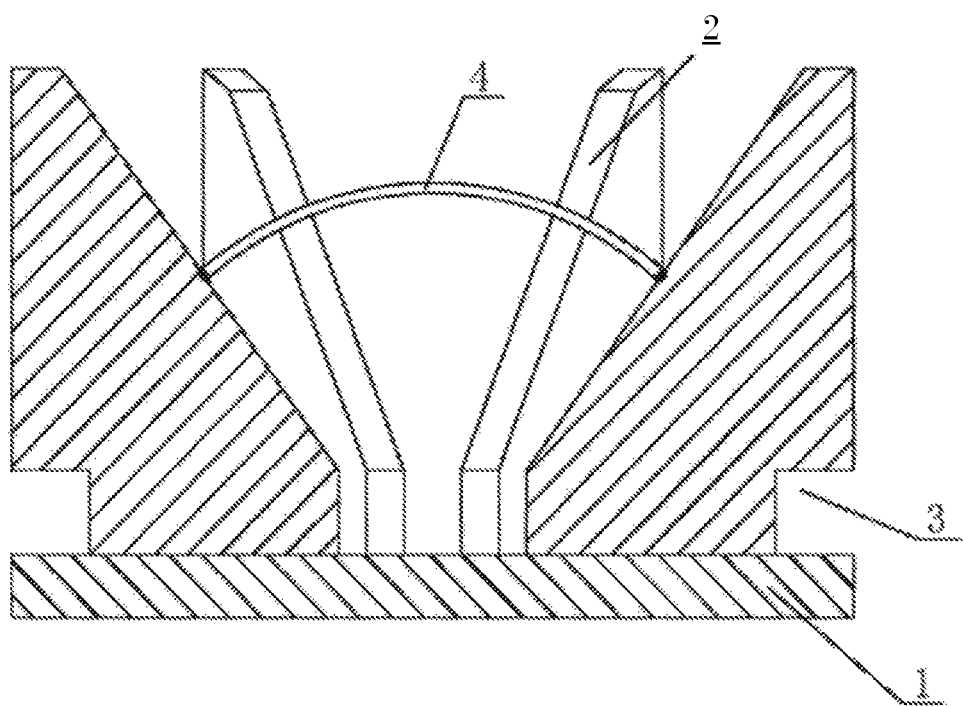
FIG. 2 is a schematic diagram of the cross-sectional structure along A-A in FIG. 1.

As shown in FIGS. 1-2, a water-soluble pipe-plugging device comprises a circular plugging plate 1 made of a water-soluble material, several support plates 2 made of a water-soluble material are provided on the surface of one side of the circular plugging plate 1, and the outer side faces of the support plates 2 are flush with the outer side face of the circular plugging plate 1.

The support plates 2 are arranged perpendicularly to the circular plugging plate 1, leading to a strong capability to withstand pressure.

The support plates 2 are circumferentially arranged on the surface of one side of the circular plugging plate at an even interval, leading to a uniform load under stress and improving the capability to withstand pressure.

The support plates 2 are bonded by a water-soluble glue to the circular plugging plate 1, making it convenient for installation, easy to connect, and soluble when encountering water.

A notch 3 is formed on the bottom of the support plates 2 at a position close to the edge of the circular plugging plate 1. After the circular plugging plate 1 is knocked into the old pipe, its edge will undergo certain deformation. The notch 3 can accommodate the deformed edge position of the circular plugging plate 1, ensuring that the outer side faces of the support plates 2 are flush with the outer side face of the circular plugging plate 1, and facilitating the bonding of the outer side faces of the support plates 2 to the inner wall of the pipe with the water-soluble glue.

The several support plates 2 are integrally connected via a reinforcing ring 4 made of a water-soluble material, and are applicable for large diameter pipes. The strength and the capability to withstand pressure can be improved.

A water-soluble pipe-plugging method comprises the following specific steps:

(a) Cutting off, through cold cutting, a part of an old pipe to be replaced or repaired;

(b) Using a clean wiping rag to clean the inner wall of the old pipe at both sides of the cut in the step (1) until there is no grease or dirt;

(c) Determining a position for installing the product where the product temperature is below 60° C. according to heat conduction generated from the welding location during welding, and drawing a line on the inner wall of the old pipe at both sides;

(d) Spreading a ring of a water-soluble glue at the position of the line on the inner wall of the old pipe at both sides, respectively;

(e) Selecting a circular plugging plate of a diameter corresponding to the inner diameter of the old pipe, and the diameter of the circular plugging plate is slightly greater than the inner diameter of the old pipe;

(f) Pushing one circular plugging plate into the old pipe at both sides, respectively, such that the edge of the circular plugging plate rests tightly against the water-soluble glue in the step (d);

(g) Securing several support plates with the water-soluble glue onto the surface of the external side of the two circular plugging plates, respectively;

(h) Bonding each support plate to the inner wall of the old pipe at both sides, respectively;

(i) Pushing a new pipe into the cut in the step (a);

(j) Welding the new pipe to the old pipe.

In the step (f), an operator uses a pushing device to push the circular plugging plates into the old pipe.

The pushing device comprises a disc and a push rod is fixed perpendicularly to the center of the disc.

The present invention employs the technical solution to provide a set of convenient, efficient and safe pipe plugging and isolating product, which ensures the safety of welding operations during repair and replacement of pipes for transporting petroleum, gas, and hazardous chemicals. Moreover, the product can be thoroughly decomposed. Therefore, there is no need to take it out, pipes will not be polluted and plugged, and the environment will not be polluted due to its biodegradability.

The above specific implementation manners may not be used as limitations to the scope of the present invention. To those skilled in the art, any substitution, improvement, or variation made to the implementation manners of the present invention shall be encompassed by the present invention.

The parts of the present invention that are not described in detail are technologies well known to those skilled in the art.

The invention claimed is:

1. A water-soluble pipe-plugging device, comprising a circular plugging plate made of a water-soluble material, several support plates made of a water-soluble material being provided on the surface of one side of the circular plugging plate, and outer side faces of the support plates being flush with an outer side face of the circular plugging plate and wherein each support plate is oriented with a longitudinal axis coinciding with a radius of the circular plugging plate.

2. The water-soluble pipe-plugging device according to claim 1, characterized in that the support plates are arranged perpendicularly to the circular plugging plate.

3. The water-soluble pipe-plugging device according to claim 1, characterized in that the support plates are circumferentially arranged on the surface of one side of the circular plugging plate at an even interval.

4. The water-soluble pipe-plugging device according to claim 1, characterized in that the support plates are bonded by a water-soluble glue to the circular plugging plate.

5. The water-soluble pipe-plugging device according to claim 1, characterized in that a notch is formed on the bottom of the support plates at a position adjacent to an edge of the circular plugging plate.

6. The water-soluble pipe-plugging device according to claim 1, characterized in that the several support plates are integrally connected via a reinforcing ring made of a water-soluble material.

7. A water-soluble pipe-plugging method for a water-soluble pipe-plugging device, comprising the following specific steps:
   (a) Cutting off, through cold cutting, a part of a first pipe to be replaced or repaired, thereby forming a first side and a second side of the first pipe separated by a cut;
   (b) Using a wiping rag to clean the inner wall of the first pipe at both sides until there is no grease or dirt;
   (c) Determining a position for installing the water-soluble pipe-plugging device where the water-soluble pipe-plugging device temperature is below 60° C. according to heat conduction generated from a welding location during welding, and drawing a line on the inner wall of the first pipe at both sides;
   (d) Spreading a ring of a water-soluble glue at the position of the line on the inner wall of the first pipe at both sides, respectively;
   (e) Selecting two water-soluble circular plugging plates of a diameter corresponding to the inner diameter of the first pipe, wherein the diameter of the circular plugging plates is slightly greater than the inner diameter of the first pipe;
   (f) Pushing one of the circular plugging plates into the first pipe at each of the first side and second side, such that an edge of each circular plugging plate rests tightly fits against the ring of water-soluble glue spread in step (d);
   (g) Securing several water-soluble support plates with water-soluble glue onto a surface of the external side of the two circular plugging plates, respectively, wherein outer side faces of the support plates are disposed flush with an outer side face of each of the circular plugging plates and wherein each of the support plates are oriented with a longitudinal axis coinciding with a radius of each of the circular plugging plates;
   (h) Bonding each support plate to the inner wall of the first pipe at both sides, respectively;
   (i) Pushing a second pipe into the cut from step (a);
   (j) Welding the second pipe to the first pipe.

8. The water-soluble pipe-plugging method according to claim 7, characterized in that step (f) further comprises using a pushing device to push the circular plugging plates into the first pipe.

9. The water-soluble pipe-plugging method according to claim 8, characterized in that the pushing device comprises a disc and a push rod fixed perpendicularly to the center of the disc.

* * * * *